(12) United States Patent
Shirasu et al.

(10) Patent No.: US 8,016,433 B2
(45) Date of Patent: *Sep. 13, 2011

(54) PROJECTOR AND CONTROL METHOD THEREOF

(75) Inventors: Toshiyuki Shirasu, Kanagawa (JP); Daizo Oka, Kanagawa (JP); Hirobumi Nagumo, Kanagawa (JP); Tessho Ishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 660 days.

This patent is subject to a terminal disclaimer.

(21) Appl. No.: 12/035,835

(22) Filed: Feb. 22, 2008

(65) Prior Publication Data

US 2008/0297736 A1 Dec. 4, 2008

(30) Foreign Application Priority Data

Mar. 9, 2007 (JP) ................. 2007-060435
Mar. 9, 2007 (JP) ................. 2007-060437
Mar. 9, 2007 (JP) ................. 2007-060439

(51) Int. Cl.
  *G03B 21/20* (2006.01)
  *G03B 21/00* (2006.01)
  *G05F 1/00* (2006.01)
  *H05B 37/02* (2006.01)
  *H05B 39/04* (2006.01)
  *H05B 41/36* (2006.01)

(52) U.S. Cl. ................. 353/85; 353/122; 315/291

(58) Field of Classification Search ............. 353/30–31, 353/69, 72, 85–87, 122; 315/291, 293–294
See application file for complete search history.

(56) References Cited

U.S. PATENT DOCUMENTS

| 947,490 | A | 1/1910 | Gwozdz |
| 3,772,565 | A | 11/1973 | Lenz et al. |
| 6,169,377 | B1 | 1/2001 | Bryde et al. |
| 6,184,632 | B1 | 2/2001 | Kamata et al. |
| 6,268,799 | B1 | 7/2001 | Miyashita et al. |
| 6,317,171 | B1 | 11/2001 | Dewald |

(Continued)

FOREIGN PATENT DOCUMENTS

CN   1461147 A   12/2003

(Continued)

OTHER PUBLICATIONS

U.S. Appl. No. 12/037,330, filed Feb. 26, 2008, Shirasu, et al.

(Continued)

*Primary Examiner* — Tony Ko
*Assistant Examiner* — Jori S Reilly-Diakun
(74) *Attorney, Agent, or Firm* — Oblon, Spivak, McClelland, Maier & Neustadt, L.L.P.

(57) ABSTRACT

A projector that can be loaded with lamps of a plurality of kinds, each of a plurality of the lamps loadable into the projector being given a lamp serial code formed by arranging lamp information including at least a minimum wattage and a maximum wattage of the lamp and a check sum in predetermined order, the projector including: a lamp power supply for driving the lamp loaded in the projector, the lamp power supply being provided in advance with a plurality of mode ranges each as a range from a minimum wattage to a maximum wattage of output of the lamp power supply, and one predetermined mode range of the plurality of mode ranges being freely set in the lamp power supply; and a control circuit for controlling the lamp power supply.

3 Claims, 12 Drawing Sheets

U.S. PATENT DOCUMENTS

| | | | |
|---|---|---|---|
| 6,409,350 B1 | 6/2002 | Kakimoto et al. | |
| 6,448,715 B1 | 9/2002 | Fujiwara et al. | |
| 6,467,911 B1 | 10/2002 | Ueyama et al. | |
| 6,690,282 B2 | 2/2004 | Miyashita et al. | |
| 6,779,896 B2 | 8/2004 | Luerkens et al. | |
| 6,802,615 B2 * | 10/2004 | Okada | 353/85 |
| 6,827,453 B2 | 12/2004 | D'Alessio et al. | |
| 6,891,338 B2 | 5/2005 | Kubo | |
| 6,956,490 B2 * | 10/2005 | Childers | 340/641 |
| 6,982,529 B2 | 1/2006 | Belliveau | |
| 7,006,004 B2 | 2/2006 | Miyashita et al. | |
| 7,045,984 B2 | 5/2006 | Gonschor | |
| 7,083,287 B2 | 8/2006 | Pate et al. | |
| 7,088,058 B2 | 8/2006 | Shiota et al. | |
| 7,377,658 B2 | 5/2008 | Jayaram et al. | |
| 7,391,475 B2 | 6/2008 | Pate et al. | |
| 7,589,695 B2 | 9/2009 | Tanaka | |
| 2002/0005697 A1 | 1/2002 | Morgan et al. | |
| 2003/0214638 A1 * | 11/2003 | Okada | 353/87 |
| 2003/0227765 A1 | 12/2003 | Kubo | |
| 2004/0080715 A1 * | 4/2004 | Miyashita et al. | 353/30 |
| 2004/0263800 A1 * | 12/2004 | Childers | 353/85 |
| 2005/0024219 A1 | 2/2005 | Childers | |
| 2005/0110958 A1 | 5/2005 | Schwartz et al. | |
| 2005/0243287 A1 | 11/2005 | Pate et al. | |
| 2006/0087622 A1 * | 4/2006 | Brown | 353/57 |
| 2006/0170880 A1 | 8/2006 | Dambach et al. | |
| 2006/0170882 A1 | 8/2006 | Schwartz et al. | |
| 2006/0238722 A1 | 10/2006 | Jayaram et al. | |
| 2007/0075647 A1 | 4/2007 | Tsintzouras et al. | |
| 2007/0103650 A1 | 5/2007 | Takagi et al. | |
| 2008/0218701 A1 * | 9/2008 | Shirasu et al. | 353/85 |
| 2008/0225241 A1 | 9/2008 | Chen et al. | |
| 2008/0246927 A1 | 10/2008 | Inoue et al. | |
| 2008/0291404 A1 * | 11/2008 | Shirasu et al. | 353/85 |
| 2008/0297736 A1 | 12/2008 | Shirasu et al. | |
| 2009/0122276 A1 | 5/2009 | Ito | |
| 2010/0110395 A1 | 5/2010 | Kotani et al. | |
| 2010/0128226 A1 | 5/2010 | Shibasaki | |

FOREIGN PATENT DOCUMENTS

| | | |
|---|---|---|
| EP | 1 740 022 A1 | 1/2007 |
| JP | 63-243930 | 10/1988 |
| JP | 5-260423 | 10/1993 |
| JP | 2000-314919 | 11/2000 |
| JP | 2001-21994 | 1/2001 |
| JP | 2002-311503 | 10/2002 |
| JP | 2002-357866 | 12/2002 |
| JP | 2003-324670 | 11/2003 |
| JP | 2003-348496 | 12/2003 |
| JP | 2004-85749 | 3/2004 |
| JP | 2004-239933 | 8/2004 |
| JP | 2004-309543 | 11/2004 |
| JP | 2005-19137 | 1/2005 |
| JP | 2005-148123 | 6/2005 |
| JP | 2005-181591 | 7/2005 |
| JP | 2006-3403 | 1/2006 |
| JP | 2006-120654 | 5/2006 |
| JP | 2006-173022 | 6/2006 |
| JP | 2006-185924 | 7/2006 |
| WO | WO 2005/043955 A2 | 5/2005 |

OTHER PUBLICATIONS

U.S. Appl. No. 12/029,106, filed Feb. 11, 2008, Shirasu, et al.
U.S. Appl. No. 12/038,482, filed Feb. 27, 2008, Morikawa, et al.
U.S. Appl. No. 12/166,461, filed Jul. 2, 2008, Oka.
Notice of Allowability mailed Aug. 23, 2010, in co-pending U.S. Appl. No. 12/037,528.
Notice of Allowability mailed Sep. 3, 2010, in co-pending U.S. Appl. No. 12/037,330.
Office Action issued Feb. 19, 2009, in Japan Patent Application No. 2007-060440.
Office Action mailed Jun. 11, 2010, in co-pending U.S. Appl. No. 12/029,106.
Office Action mailed Jul. 6, 2010, in co-pending U.S. Appl. No. 12/038,482.
Office Action issued Mar. 18, 2009, in Japan Patent Application No. 2007-060441.
Office Action issued Mar. 9, 2010, in Japan Patent Application No. 2007-060441.
Notice of Allowance mailed Sep. 20, 2010, in co-pending U.S. Appl. No. 12/166,461.

* cited by examiner

FIG. 4

| LAMP MODE | MAXIMUM OUTPUT WATTAGE | MINIMUM OUTPUT WATTAGE | MAXIMUM CURRENT |
|---|---|---|---|
| A | 4.6kW | 2.0kW | 167A |
| B | 4.2kW | 2.0kW | 155A |
| C | 3.0kW | 1.5kW | 115A |
| D | 2.0kW | 1.0kW | 95A |

FIG. 7

| LAMP SERIAL CODE |
|---|
| Check sum/manufacturer code/max watt/min watt/life hour/lamp serial/check sum |

PROJECTOR AND CONTROL METHOD THEREOF

CROSS REFERENCES TO RELATED APPLICATIONS

The present invention contains subject matter related to Japanese Patent Applications JP 2007-060435, JP 2007-060437, and JP 2007-060439, these filed with the Japan Patent Office on Mar. 9, 2007, the entire contents of which being incorporated herein by reference.

BACKGROUND OF THE INVENTION

1. Field of the Invention

The present invention relates to a projector and a control method thereof, and particularly to a projector and a control method thereof that properly assist in an operation of replacing a lamp in a projector, whereby proper driving control for the lamp can be realized.

2. Description of the Related Art

Recently, with the development of video display technology, a projector applicable to a field of so-called digital cinema, that is, a projector usable for a purpose of screening a movie in a movie theater has appeared (see Japanese Patent Laid-Open No. Hei 5-260423, for example).

As such a projector, there is a projector having a power supply (hereinafter referred to as a lamp power supply) that can drive lamps of a plurality of kinds of lamp sizes. A lamp size in this case refers to an input rating such as a minimum wattage, a maximum wattage and the like of the lamp.

The life of the lamp is not infinite but finite. It is therefore necessary to manage the use time or the like of the lamp properly, and replace the lamp at an appropriate time. This is because some lamps may demand replacement a maximum of about eight times a year.

In this case, in the past, a lamp replacing worker manually sets the lamp power supply according to the lamp size of a lamp to be substituted. Alternatively, the lamp replacing worker selects a lamp of a predetermined lamp size according to the setting of the lamp power supply.

SUMMARY OF THE INVENTION

However, in this case, the lamp replacing worker may make a wrong setting through an operation mistake, or select a wrong lamp. In such a case, there is a danger of a current exceeding a rated current flowing through the lamp and thus a burst failure or the like occurring.

A wrong lamp in this case refers to a lamp of a lamp size that does not match the setting of the lamp power supply unit. A reason that the lamp size does not match the setting of the lamp power supply unit may be that the selection of the lamp size itself is wrong, or that although the selection of the lamp size itself is correct, a lamp of a lamp size different from the selected lamp size is prepared by mistake because lamps are generally identical or similar in shape.

In addition, when a lamp of a lamp size that does not perfectly match the set range of the lamp power supply unit prepared in advance is loaded into the existing projector, even use of the lamp is not possible in the first place.

The present invention has been made in view of such a situation. It is desirable to assist properly in an operation of replacing a lamp in a projector, and thereby realize proper driving control for the lamp.

According to an embodiment of the present invention, there is provided a projector that can be loaded with lamps of a plurality of kinds, each of a plurality of the lamps loadable into the projector being given a lamp serial code formed by arranging lamp information including at least a minimum wattage and a maximum wattage of the lamp and a check sum in predetermined order. The projector includes: a lamp power supply for driving the lamp loaded in the projector, the lamp power supply being provided in advance with a plurality of mode ranges each as a range from a minimum wattage to a maximum wattage of output of the lamp power supply, and one predetermined mode range of the plurality of mode ranges being freely set in the lamp power supply; and a control circuit for controlling the lamp power supply. The control circuit sets a range from the minimum wattage to the maximum wattage included in the lamp serial code given to the lamp loaded in the projector as a code range, and compares the code range with the mode range set in the lamp power supply. The control circuit determines a range not exceeding the maximum wattage included in the lamp serial code as a lamp driving controlling range within which the driving of the lamp power supply is controlled on a basis of a result of comparison of the code range with the mode range. The control circuit controls the driving of the lamp power supply within the determined lamp driving controlling range.

The control circuit determines a range in which the code range and the mode range overlap each other as the lamp driving controlling range.

A control method of a projector according to an embodiment of the present invention is a method corresponding to a control method of the control circuit in the projector according to the above-described embodiment of the present invention.

In the projector according to the above-described embodiment of the present invention and the control method of the projector, the projector can be loaded with lamps of a plurality of kinds of lamp sizes, and each of a plurality of the lamps loadable into the projector is given a lamp serial code formed by arranging lamp information including at least a minimum wattage and a maximum wattage of the lamp and a check sum in predetermined order. The projector includes: a lamp power supply for driving the lamp loaded in the projector, the lamp power supply being provided in advance with a plurality of mode ranges each as a range from a minimum wattage to a maximum wattage of output of the lamp power supply, and one predetermined mode range of the plurality of mode ranges being freely set in the lamp power supply; and a control circuit for controlling the lamp power supply. In the projector, the following control is performed. A range from the minimum wattage to the maximum wattage included in the lamp serial code given to the lamp loaded in the projector is set as a code range, and the code range is compared with the mode range set in the lamp power supply. On a basis of a result of the comparison, a range not exceeding the maximum wattage included in the lamp serial code is determined as a lamp driving controlling range within which the driving of the lamp power supply is controlled. As a result, the driving of the lamp power supply is controlled within the determined lamp driving controlling range.

As described above, according to the embodiment of the present invention, it is possible to control the driving of the lamp of the projector. In particular, it is possible to assist properly in an operation of replacing a lamp in a projector, and thereby realize proper driving control for the lamp.

BRIEF DESCRIPTION OF THE DRAWINGS

FIG. 4 is a diagram showing an example of lamp modes that can be set in a lamp power supply of the projector of FIG. 2;

FIG. 7 is a diagram showing an example of structure of a lamp serial code;

DETAILED DESCRIPTION OF THE PREFERRED EMBODIMENTS

Preferred embodiments of the present invention will hereinafter be described. Correspondences between constitutional requirements of the present invention and embodiments described in the detailed description of the invention are illustrated as follows. This description is to confirm that embodiments supporting the present invention are described in the detailed description of the invention. Therefore, even when there is an embodiment described in the detailed description of the invention but not described here as corresponding to a constitutional requirement, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

Further, this description does not signify that inventions corresponding to concrete examples described in the detailed description of the invention are all described in the claims. In other words, this description does not negate presence of inventions corresponding to concrete examples described in the detailed description of the invention but not described in the claims of the present application, that is, presence of inventions to be presented in a divisional application or to be added by amendments in the future.

Figure 1:
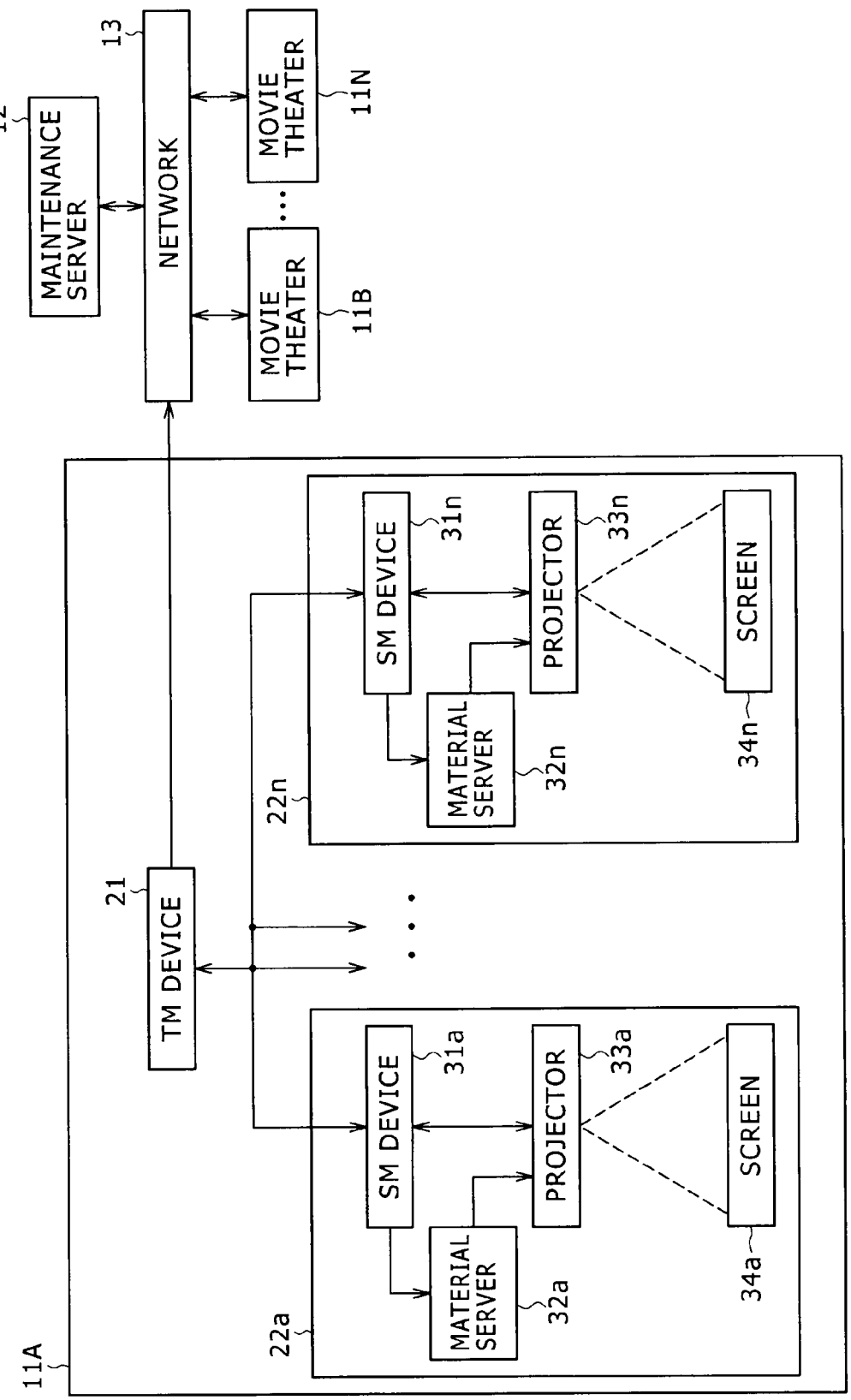
FIG. 1 is a diagram showing an example of configuration of an information processing system to which an embodiment of the present invention is applied.
Figure 2:
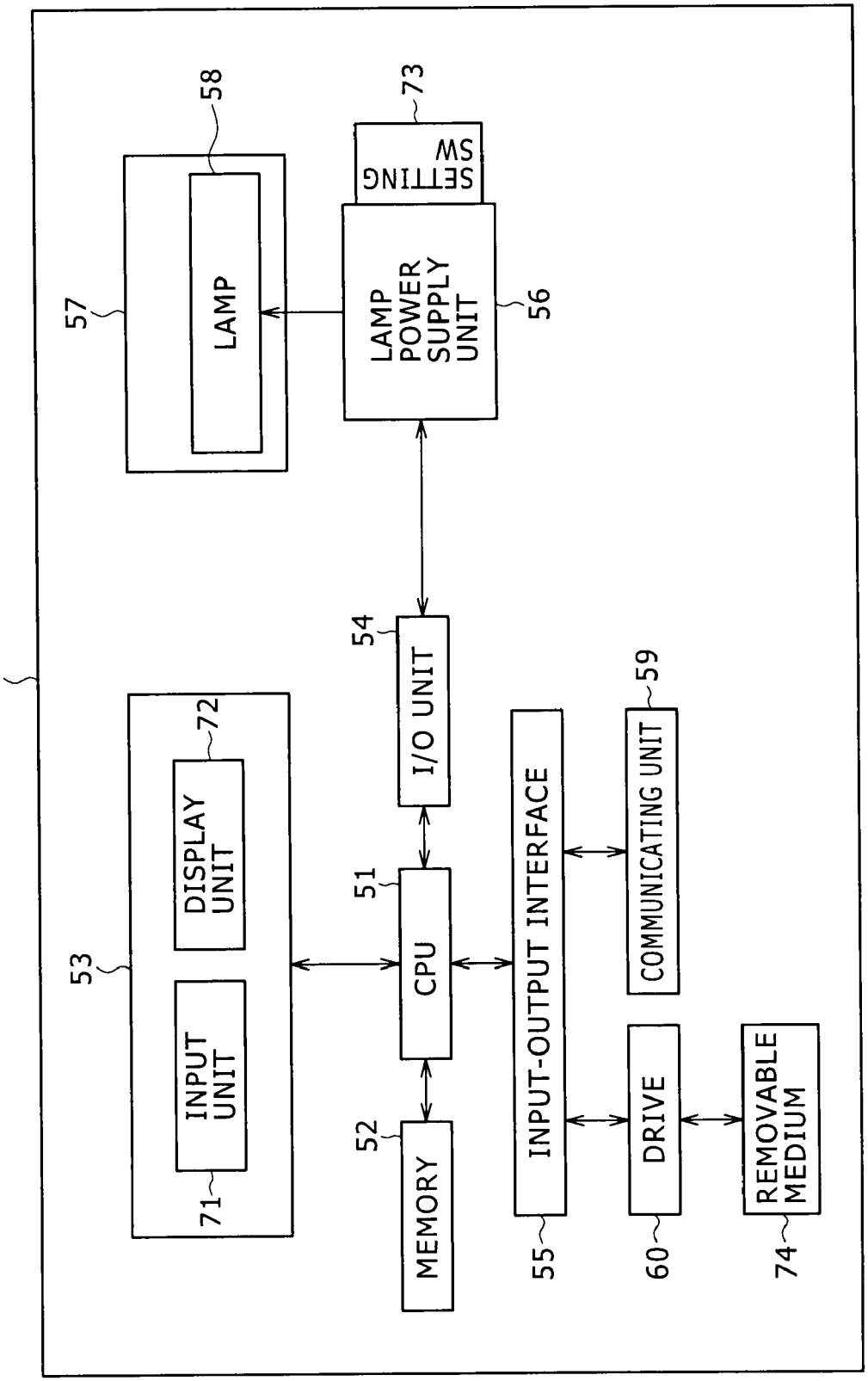
FIG. 2 is a diagram showing an example of configuration of a projector to which the embodiment of the present invention is applied, the projector being one constituent element of the information processing system of FIG. 1.
Figure 5:
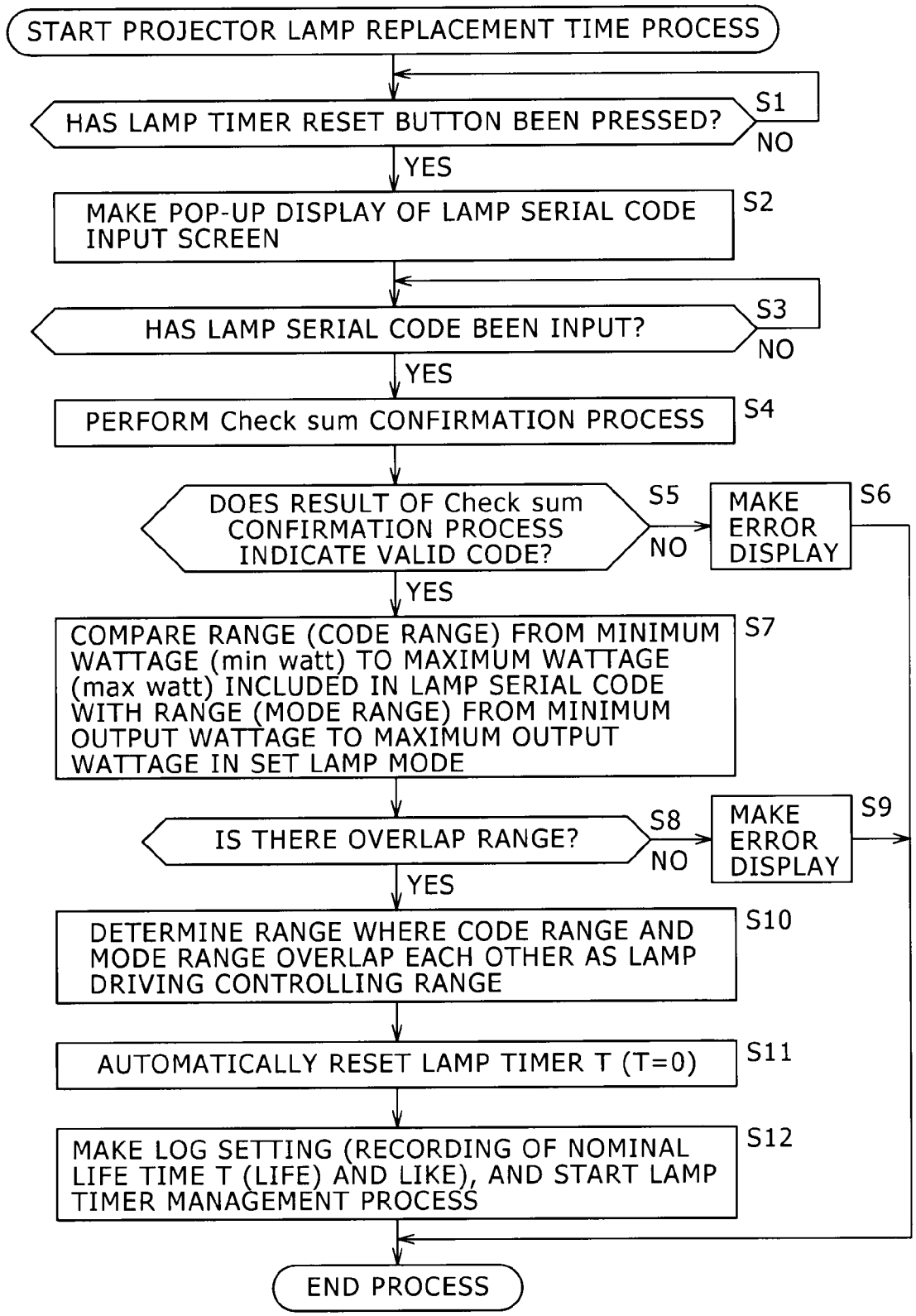
FIG. 5 is a flowchart of assistance in explaining an example of a projector lamp replacement time process among processes performed by the projector of FIG. 2.

A projector according to an embodiment of the present invention is a projector (a projector 33 in FIG. 2 that can be installed in movie theaters 11A to 11N in FIG. 1, for example) that can be loaded with lamps (a lamp 58 having the shape of FIG. 3, for example) of a plurality of kinds of lamp sizes, each of a plurality of the lamps loadable into the projector being given a lamp serial code (a lamp serial code having the structure of FIG. 7, for example) formed by arranging lamp information including at least a minimum wattage and a maximum wattage of the lamp and a check sum in predetermined order, the projector including: a lamp power supply (for example a lamp power supply unit 56 having a setting SW 73 in FIG. 2 as a switch for setting one predetermined mode of lamp modes A to D in FIG. 4) for driving the lamp loaded in the projector, the lamp power supply being provided in advance with a plurality of mode ranges each as a range from a minimum wattage to a maximum wattage of output of the lamp power supply (for example four mode ranges defined by respective maximum output wattages and minimum output wattages of lamp modes A to D in FIG. 4), and one predetermined mode range of the plurality of mode ranges being freely set in the lamp power supply; and a control circuit (for example a CPU 51 in FIG. 2) for controlling the lamp power supply; wherein the control circuit sets a range from the minimum wattage to the maximum wattage included in the lamp serial code given to the lamp loaded in the projector as a code range, and compares the code range with the mode range set in the lamp power supply (for example step S7 in FIG. 5), the control circuit determines a range not exceeding the maximum wattage included in the lamp serial code as a lamp driving controlling range within which the driving of the lamp power supply is controlled on a basis of a result of comparison of the code range with the mode range (for example step S10 after a result of determination in step S8 is YES in FIG. 5), and the control circuit controls the driving of the lamp power supply within the determined lamp driving controlling range.

Figure 9:
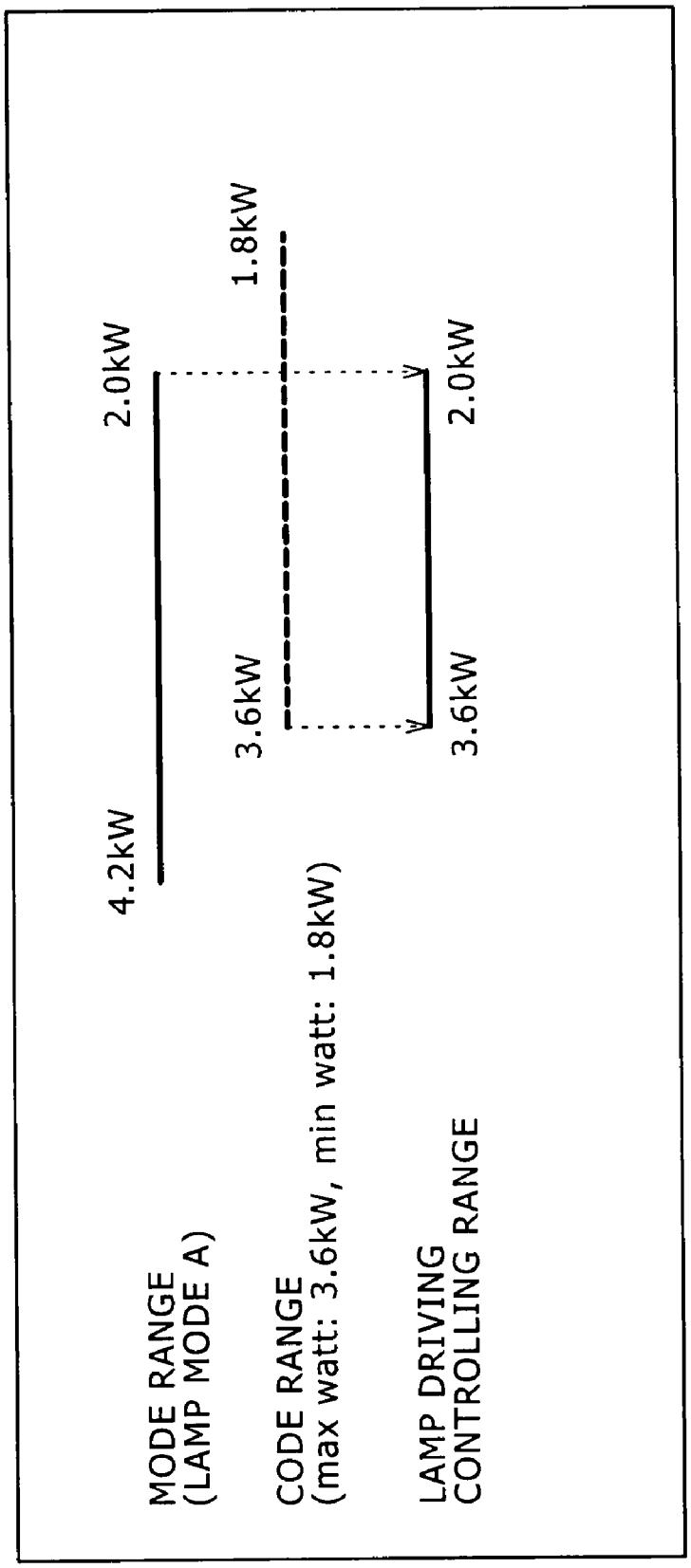
FIG. 9 is a diagram of assistance in explaining a method of determining a lamp driving controlling range to which the embodiment of the present invention is applied.

The control circuit determines a range in which the code range and the mode range overlap each other as the lamp driving controlling range (see FIG. 9, for example).

A controlling method of a projector according to an embodiment of the present invention is a method (for example a method corresponding to a projector lamp replacing time process of FIG. 5 among processes performed by a CPU 51 in the projector 33 of FIG. 2) corresponding to a controlling method of the control circuit in the projector according to the above-described embodiment of the present invention.

Preferred embodiments of the present invention will hereinafter be described with reference to the drawings.

FIG. 1 shows an example of configuration of an information processing system to which the present invention is applied, the information processing system being applied to a field of digital cinema.

The information processing system in the example of FIG. 1 is formed by interconnecting various devices (to be described later in detail) installed in movie theaters 11A to 11N and a maintenance server 12 via a predetermined network such as the Internet or the like. The maintenance server 12 in this case refers to for example a device used by a provider of, as a service, maintenance of the various devices installed in the movie theaters 11A to 11N.

The movie theater 11A includes a plurality of screening places 22a to 22n to be able to screen a plurality of movies in parallel. For centralized management of the plurality of screening places 22a to 22n, a Theater Management device 21 (hereinafter referred to as a TM device 21) is installed in the movie theater 11A.

The screening place 22a includes a Screen Management device 31a (hereinafter referred to as an SM device 31a) to a screen 34a.

Similarly, the screening place 22n includes an SM device 31n to a screen 34n. Each screening place 22k (k is an arbitrary lower-case letter of the alphabet) not shown in the figure other than the screening place 22a and the screening place 22n includes an SM device 31k to a screen 34k.

Incidentally, hereinafter, when the screening places 22a to 22n do not need to be individually differentiated from each other, the screening places 22a to 22n will be collectively referred to simply as a screening place 22. In addition, hereinafter, when the screening place 22k is referred to simply as the screening place 22, the SM device 31k to the screen 34k will also be referred to as the SM device 31 to the screen 34, respectively.

The SM device 31 is a device that performs centralized management of the screening place 22. The SM device 31 controls other devices within the screening place 22, that is, a material server 32, a projector 33 and the like. In addition, the SM device 31 communicates with the TM device 21 to send and receive various information to and from the TM device 21 as necessary.

The material server 32 provides digital data of a movie (material) to be screened in the screening place 22 to the projector 33.

The projector 33 projects an image corresponding to the digital data provided from the material server 32 onto the screen 34. Thereby the movie is screened on the screen 34.

Though not shown in the figure, the other movie theaters 11B to 11N similarly have one or more screening places 22. Each screening place 22 is provided with an SM device 31 to a screen 34.

As described above, the information processing system of FIG. 1 is applied to the field of digital cinema. In the field of digital cinema, a standard referred to as DCI Spec is defined by an organization referred to as DCI (Digital Cinema Initiatives). The standard specifies that "white peak luminance at the center of a screen be 48 cd/m² (14 ft-L) as an image parameter to be referred to". At 14 ft-L=48 cd/m², a brightness of about 48 candles per square meter may be demanded at the center of the screen 34. In other words, the brightness (illuminance) of the image projected on the screen 34 may need to be maintained at a constant level at all times.

On the other hand, the screen 34 is widely varied in size according to the capacity of the screening place 22 or the like.

Thus, according to the size of the screen 34 onto which to perform projection, an optimum lamp that can meet DCI Spec, for example a xenon lamp, may need to be used as a light source of each projector 33.

In addition, as for the angle of view of movies, there are various sizes, including for example a "standard size" with an aspect ratio of 1:1.33, a "Vista size (a European standard)" with an aspect ratio of 1:1.66, a "Vista size (an American standard)" with an aspect ratio of 1:1.85, and a "CinemaScope size (registered trademark)" with an aspect ratio of 1:2.35. Thus, a change may need to be made from one predetermined angle of view to another angle of view among the various angles of view in the same screening place 22, that is, on the same screen 34. In such a case, the zoom magnification of a lens of the projector 33 may need to be changed. According to this change, the power of the lamp (input watts) may need to be changed so as to maintain the brightness (illuminance) of the image on the screen 34 at a constant level, as described above. Consequently, a light quantity gain of the lamp may need to be secured for a fixed quantity. Thus, it may be necessary to use a lamp whose minimum wattage and maximum wattage or the like as an input rating (such an input rating will hereinafter be referred to also as lamp size) can accommodate the change, and to make an appropriate setting on a side driving the lamp.

The lamp has a life. It may therefore be necessary to manage the use time or the like of the lamp appropriately, and to replace the lamp at appropriate periods. This is because some lamps may need to be replaced a maximum of about eight times a year.

Figure 3:
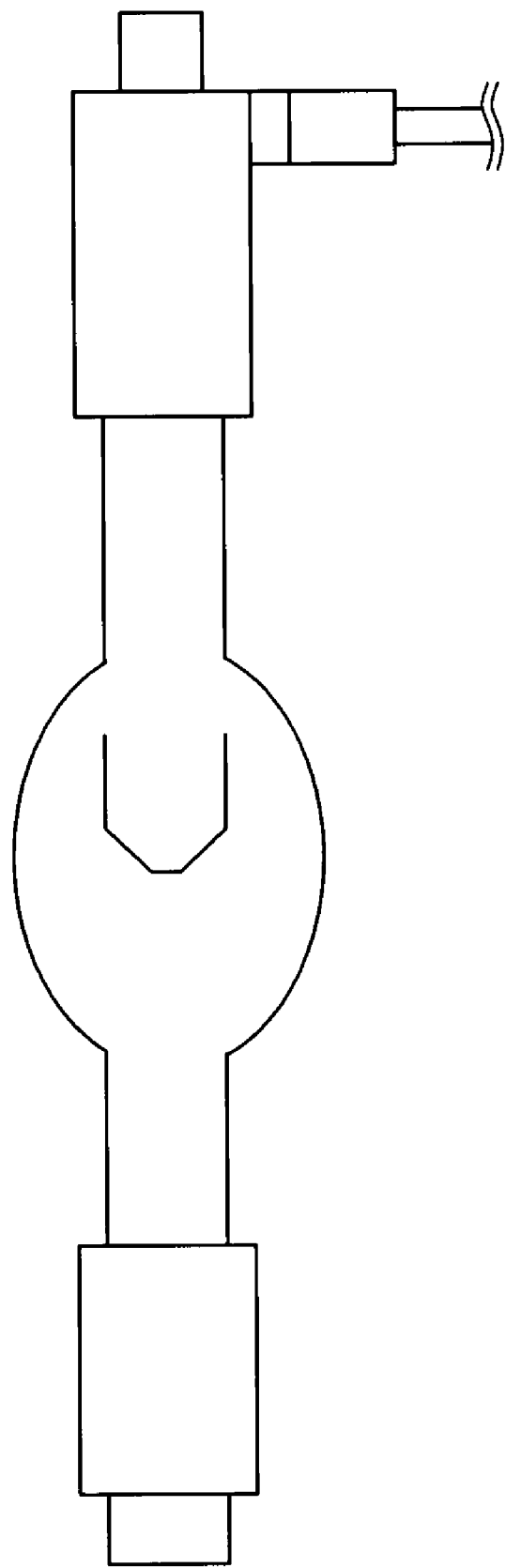
FIG. 3 is a diagram showing an example of external structure of a lamp loaded into the projector of FIG. 2.

Further, the lamp is inserted into a predetermined lamphouse (for example a lamphouse 57 in FIG. 2 in the present embodiment). Therefore the shape itself of lamps is identical or similar to secure functions (for example the shape of FIG. 3 is adopted in the present embodiment). However, there are no clear specifications for lamp size, so that lamps of various lamp sizes may be distributed on the market. When the movie theaters 11A to 11N in FIG. 1 are scattered in places distant from each other, in particular, lamps made by lamp manufacturers (manufacturing makers) in respective areas are often used. In such a case, a possibility of lamps of different lamp sizes being distributed on the market in the different areas is further increased. Hence, even when the projectors 33 in the movie theaters 11A to 11N project an image onto the screens 34 of a same size, lamps of different lamp sizes may be used as lamps loaded in the projectors 33.

Thus, there is a situation specific to the field of digital cinema regarding lamps for projectors in the field of digital cinema. As a result, various problems as described in the following occur in a movie theater using an existing projector.

For example, there is an existing projector having a power supply (hereinafter referred to as a lamp power supply unit) capable of driving lamps of a plurality of kinds of lamp sizes. In this case, in the past, a lamp replacing worker manually sets the lamp power supply unit according to the lamp size of a lamp with which to perform replacement. Alternatively, the lamp replacing worker selects a lamp of a predetermined lamp size according to the setting of the lamp power supply unit. In this case, the lamp replacing worker may make a wrong setting through an operation mistake, or select a wrong lamp. In such a case, there is a danger of a current exceeding a rated current flowing through the lamp and thus a burst failure or the like occurring. A wrong lamp in this case refers to a lamp of a lamp size that does not match the setting of the lamp power supply unit. A reason that the lamp size does not match the setting of the lamp power supply unit may be that the selection of the lamp size itself is wrong, or that although the selection of the lamp size itself is correct, a lamp of a lamp size different from the selected lamp size is prepared by mistake because lamps are generally identical or similar in shape and the lamp size may not be determined by only a visual check. When a lamp of a lamp size that does not perfectly match the set range of the lamp power supply unit prepared in advance is loaded into the existing projector, even use of the lamp is impossible in the first place. Such a problem will hereinafter be referred to as a lamp size problem.

In addition, for example, because it may be necessary to manage the use time or the like of the lamp appropriately, as described above, a timer (hereinafter referred to as a lamp timer) for measuring the lamp use time is provided also in the existing projector. In the past, however, the lamp timer can be reset at any time by an operator or the like in the screening place 22. Therefore, even when the life of the lamp has ended within a guaranteed time of the lamp, there is no means for officially proving that the life of the lamp has ended within the guaranteed time of the lamp. That is, when the life of the lamp has ended within the guaranteed time of the lamp, a new lamp can be offered free of charge, with a special agreement concluded for free replacement of the lamp or the like. However, there is no means for determining whether or not to implement the agreement. In addition, a projector capable of being loaded with a plurality of kinds of lamp sizes includes a part whose periodic replacement time differs depending on light quantity (lamp size). When determining a replacement time of such a part, a part replacing person (a serviceman) has no means for checking history information indicating what lamp has been used. Such a problem will hereinafter be referred to as a lamp use history problem.

In addition, for example, the existing lamp timer can be reset at any time by an operator or the like in the screening place 22, as described above. There is thus a possibility that the lamp use time is not strictly managed. Further, as described above, even a lamp not certified for the existing projector can be readily used in the projector. The lamp is often inappropriate in terms of adaptability (for example cooling, driving current, mechanical size, and the like) to the projector. As a result, there is a danger of the projector failing, or the lamp bursting, for example. Such a problem will hereinafter be referred to as a lamp management problem.

In addition, in the field of digital cinema, each of the movie theaters 11A to 11N desires to purchase lamps from a plurality of lamp manufacturers in order to lower maintenance cost. Thus, as described above, lamps of various lamp sizes are mixed in the market. On the other hand, when switching is performed between the "CinemaScope size" and the "Vista size", for example, the brightness (illuminance) of images projected on the screen 34 may need to be maintained at a constant level at all times, as described above. In this case, to secure a constant brightness, the light quantity gain of the lamp may need to be maintained at 1.6. In the past, however, no provision can be made in some cases with the set range of the lamp power supply unit prepared in advance. Such a problem will hereinafter be referred to as a lamp gain problem.

In addition, for example, In the past, a recommended replacement time differs depending on the lamp loaded into a projector having a lamp power supply unit capable of driving lamps of a plurality of kinds of lamp sizes. Therefore an operator or the like in the screening place 22 independently manages lamp replacement timing while comparing the recommended replacement time of the lamp with the lamp timer. As a result, the management is complex, and there is a danger of a screening trouble or the like occurring due to a mistake in the management. Such a problem will hereinafter be referred to as a lamp replacement time problem.

In the information processing system of FIG. 1 to which an embodiment of the present invention is applied, the projector 33 that can solve the various problems described above is installed in each screening place 22. That is, the projector 33 is one embodiment of a projector to which the present invention is applied. An example of configuration of the projector 33 is shown in FIG. 2.

In the projector 33 as the example of FIG. 2, a CPU (Central Processing Unit) 51 performs various processes according to a program or the like recorded in a memory 52. The memory 52 also stores data and the like necessary for the CPU 51 to perform the various processes.

The CPU 51 is also connected with an input-output unit 53, an I/O unit 54, and an input-output interface 55.

The input-output unit 53 is for example formed by a touch panel or the like. The input-output unit 53 includes an input unit 71 for allowing a user (an operator or the like in the screening place 22 in FIG. 1) to perform various operations, and a display unit 72 formed by a display or the like for displaying the descriptions of the operations and the like.

The I/O unit 54 relays various information sent and received between the CPU 51 and a lamp power supply unit 56. Incidentally, a concrete example of the relayed various information will be described later in the description of step S10 in FIG. 5.

The lamp power supply unit 56 is a power supply capable of driving lamps 58 of a plurality of kinds of lamp sizes. That is, the lamp power supply unit 56 provides an appropriate driving power to a lamp 58 loaded in a lamphouse 57 under control of the CPU 51 via the I/O unit 54.

The lamp 58 in the present embodiment for example has a shape shown in FIG. 3. That is, in the present embodiment, lamps having a capability (replacement capability) of being loaded into the projector 33 as lamp 58 each have the same shape as the shape of FIG. 3. However, such lamps can have various lamp sizes. It is therefore difficult for an operator or the like to determine the lamp size of a lamp to be substituted as lamp 58 by merely visually checking the shape (the shape of FIG. 3) of the lamp. As a result, there is a possibility of occurrence of various problems such as the above-described lamp size problem and the like. Accordingly, to avoid occurrence of these problems, the projector 33 performs a lamp replacement time process of FIG. 5 to be described later.

However, the shape of the lamp 58 is not limited to the example of FIG. 3, and it suffices for the lamp 58 to have such a shape as to be loadable into the lamphouse 57. In other words, the shape of the lamp 58 depends on the structure of the lamphouse 57. That is, the lamphouse 57 in the present embodiment happens to have the structure into which the lamp 58 of the shape of FIG. 3 can be loaded.

Thus, the projector 33 has a possibility of being loaded with lamps of various lamp sizes as lamp 58. The lamp power supply unit 56 is accordingly configured such that a plurality of modes (hereinafter referred to as lamp modes) can be set in the lamp power supply unit 56 as an output rating such as a maximum output wattage, a minimum output wattage, and a maximum current. Specifically, in the present embodiment, for example, each of four lamp modes A to D as shown in FIG. 4 can be set in the lamp power supply unit 56. As a switch for setting one of the lamp modes A to D, in the present embodiment, for example, a setting SW 73 shown in FIG. 2 is provided for the lamp power supply unit 56. Specifically, for example, when the lamp mode A is set by the setting SW 73, the lamp power supply unit 56 performs driving within a range defined by a maximum output wattage of 4.6 kW, a minimum output wattage of 2.0 kW, and a maximum current of 167 A, according to FIG. 4.

Incidentally, the rated output range thus defined by the lamp mode, that is, the range from the maximum output wattage to the minimum output wattage will hereinafter be referred to as a mode range. In other words, the mode range can be said to be a range for limiting output with the minimum output wattage as a lowest limit and limiting output with the maximum output wattage as a highest limit, that is, a range for limiting the driving of the lamp power supply unit 56. Specifically, for example, the mode range of the lamp mode A refers to a range of 2.0 kW to 4.6 kW (see FIG. 9 to be described later).

The input-output interface 55 in FIG. 2 is connected with a communicating unit 59 and a drive 60. The communicating unit 59 controls a process of communication with other devices including the external SM device 31 and the material server 32 (see FIG. 1). The form of the communication in this case is not specifically limited, and the communication may be a wire communication or a wireless communication. In addition, the communication may be performed through a direct connection, or may be performed via a network including the Internet.

Further, the communicating unit 59 can externally obtain a program by such communication control, and store the program in the memory 52.

When a removable medium 74 such as a magnetic disk, an optical disk, a magneto-optical disk, a semiconductor memory or the like is loaded into the drive 60, the drive 60 drives the removable medium 74 to obtain a program, data or the like recorded on the removable medium 74. The obtained program or data is transferred to the memory 52 to be stored in the memory 52 as necessary.

An example of a process performed when a predetermined lamp is substituted as a lamp 58 (hereinafter referred to as a projector lamp replacement time process) among processes performed by the projector 33 having such a configuration will next be described with reference to a flowchart of FIG. 5.

Incidentally, the description will be made referring to concrete examples of FIGS. 6 to 9.

In step S1, the CPU 51 determines whether a lamp timer reset button has been pressed.

Until the lamp timer reset button is pressed, a process of obtaining a result of determination of NO in the process of step S1 and performing the process of step S1 again is repeated.

An example of the lamp timer reset button will be described in the following with reference to FIG. 6.

Figure 6:
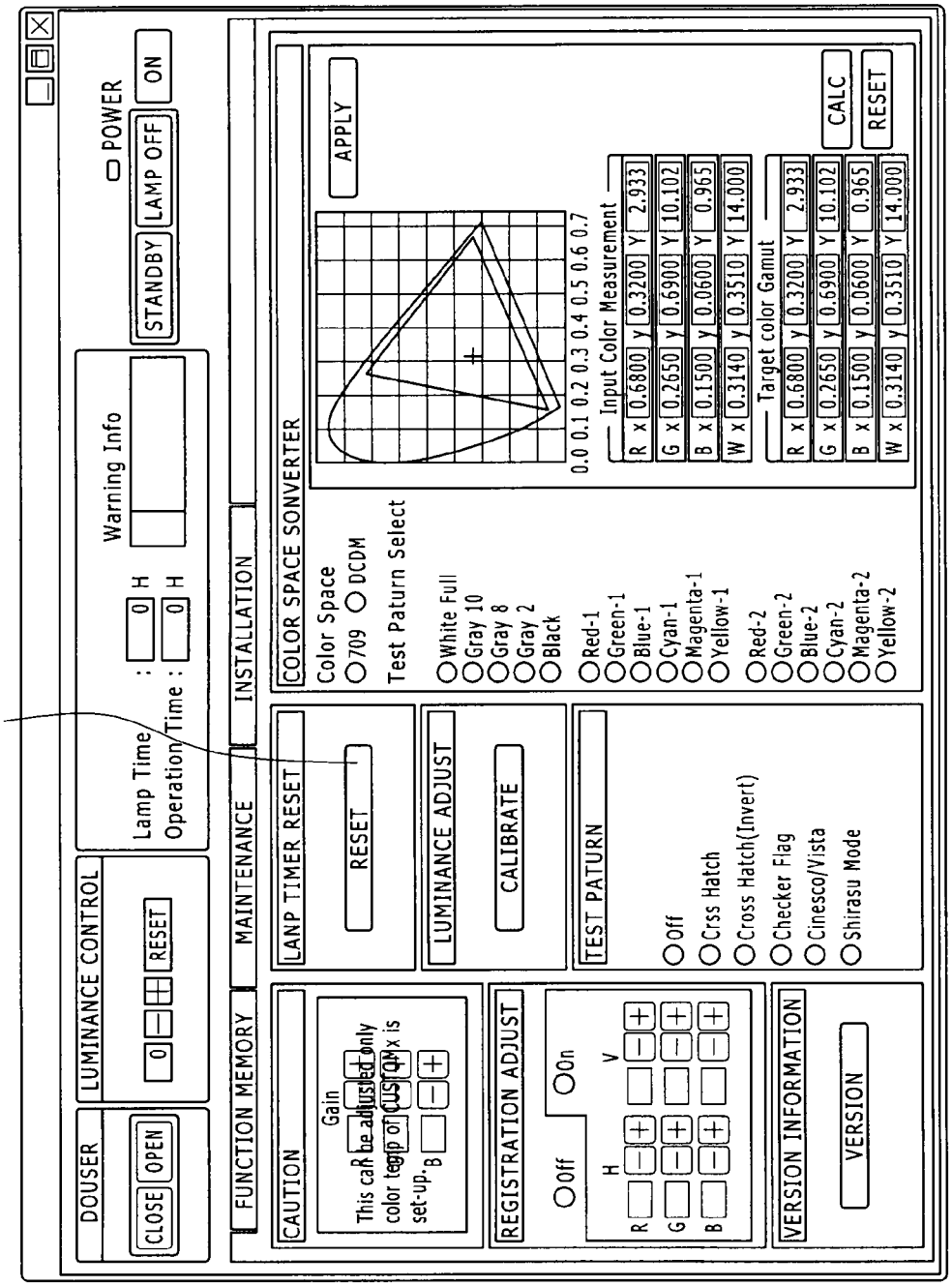
FIG. 6 is a diagram showing an example of a GUI image including a lamp timer reset button.

FIG. 6 shows an example of a GUI (Graphical User Interface) image for performing the setting, management and the like of the projector 33. In the present embodiment, for example, this GUI image is displayed on the display unit 72. In the present embodiment, for example, a software button 101 described as "RESET" in the GUI image is assigned the function of the lamp timer reset button.

Thus, after a lamp replacing worker substitutes a predetermined lamp as lamp 58, the lamp replacing worker can press the software button 101 by operating the input unit 71, or performing an operation of bringing a finger of the lamp replacing worker or the like into contact with the touch panel when the input-output unit 53 is formed by the touch panel, for example. In this case, a result of the determination in the process of step S1 in FIG. 5 is YES, and therefore the process proceeds to step S2.

In step S2, the CPU 51 makes pop-up display of a lamp serial code input screen on the display unit 72. Then, in step S3, the CPU 51 determines whether a lamp serial code has been input.

The lamp serial code and the lamp serial code input screen will be described in the following with references to FIG. 7 and FIG. 8.

The lamp serial code refers to information formed by arranging one or more pieces of lamp information on a predetermined lamp and the like in predetermined order when a lamp manufacturer (manufacturing maker) manufactures the predetermined lamp that can be a lamp 58. "And the like" is included in the "lamp information . . . and the like" because information other than the lamp information, such as a check sum ("Check sum"/"check sum") or the like, can be included in the lamp serial code, as will be described later. The lamp information itself is not specifically limited as long as the lamp information is information on the predetermined lamp. For example, information for uniquely identifying the predetermined lamp (ID or the like), management information on the predetermined lamp, and the like can be adopted as the lamp information.

Incidentally, a lamp as an object to which the lamp serial code is given will hereinafter be referred to as an object lamp.

The lamp serial code is provided together with the object lamp, for example. Specifically, in the present embodiment, for example, the lamp serial code is printed on a paper medium, and the paper medium is packaged and shipped together with the object lamp.

FIG. 7 shows an example of structure of the lamp serial code. As shown in FIG. 7, the lamp serial code is formed by arranging pieces of text information "Check sum/manufacturer code/max watt/min watt/life hour/lamp serial/check sum".

"Check sum"/"check sum" is information used to determine whether predetermined text information input by a lamp replacing worker as the lamp serial code in the process of step S3 in FIG. 5 to be described later is a valid lamp serial code after the object lamp is substituted as the lamp 58 in the projector 33.

Thus, as described above, the lamp serial code may need to be created additionally when the lamp manufacturer (manufacturing maker) manufactures the object lamp. "Check sum"/"check sum" is calculated when the lamp serial code is created. Incidentally, a method of creating the lamp serial code will be described later with reference to FIG. 12.

"manufacturer code" is one piece of lamp information, and is a code for identifying the lamp manufacturer (manufacturing maker) of the object lamp, or a so-called maker ID.

"max watt" is one piece of lamp information, and is information indicating a maximum wattage of the lamp size (input rating) of the object lamp.

"min watt" is one piece of lamp information, and is information indicating a minimum wattage of the lamp size (input rating) of the object lamp.

"life hour" is one piece of lamp information, and is information indicating the nominal life time of the object lamp.

"lamp serial" is one piece of lamp information, and is information making it possible to identify the object lamp uniquely, or a so-called serial number.

A GUI image for inputting such a lamp serial code to the projector 33 is the lamp serial code input screen. The pop-up display of an image 102 as shown in FIG. 8, for example, is made on the display unit 72, as shown in the same figure.

Accordingly, when a lamp replacing worker mounts the object lamp as lamp 58 in the lamphouse 57, that is, when the lamp replacing worker replaces the lamp 58 with the object lamp, the lamp replacing worker can input the lamp serial code of the object lamp in a box 111 of the lamp serial code input screen 102, that is, the box 111 on the right of display "Serial Code". For this input, the input unit 71 is used in the present embodiment, for example.

Meanwhile, in the projector lamp replacement time process of FIG. 5, a process of obtaining a result of determination of NO in the process of step S3 and performing the process of step S3 again is repeated.

Figure 8:
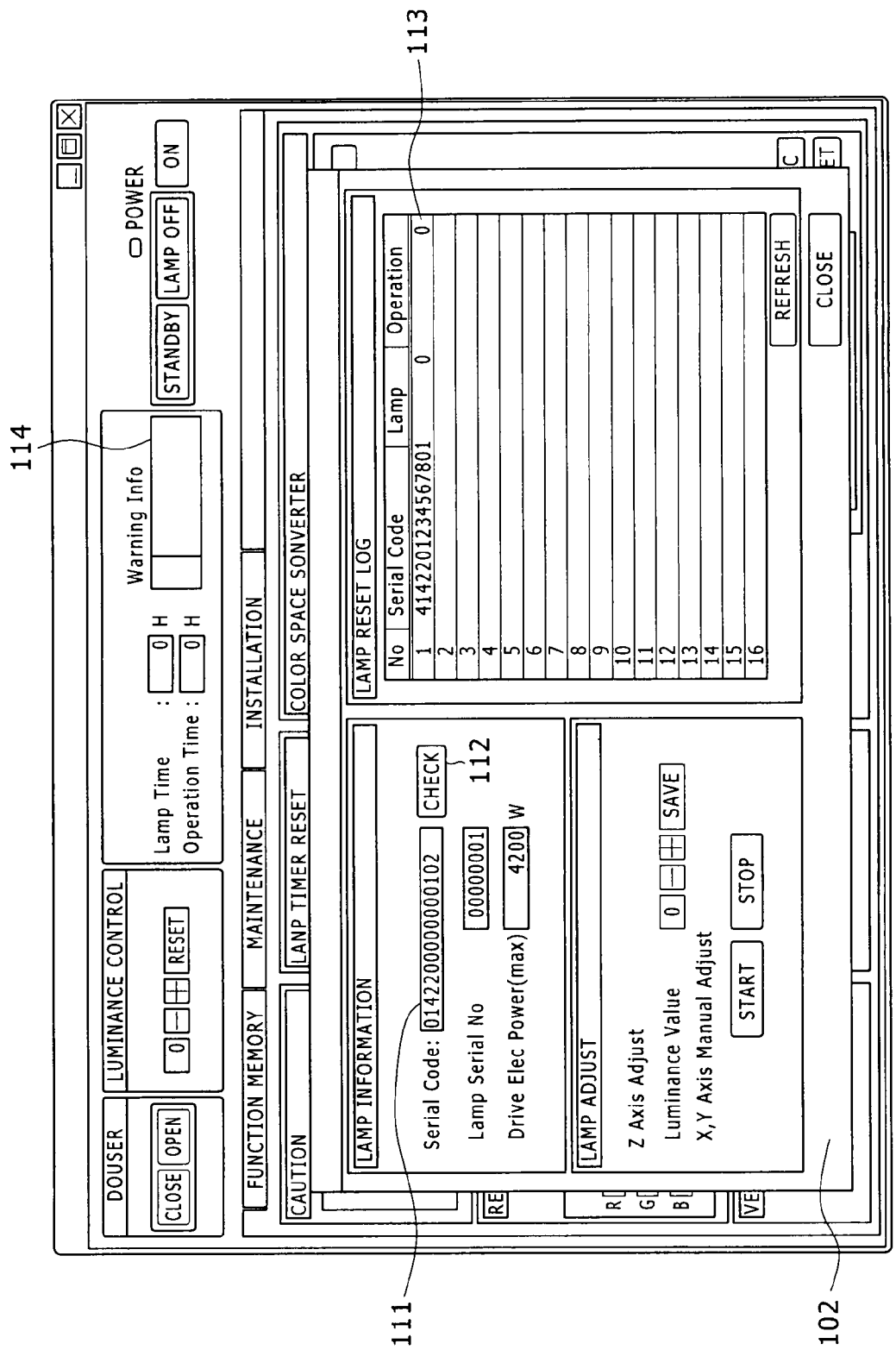
FIG. 8 is a diagram showing an example of a GUI image including a lamp serial code input screen displayed by pop-up display.

When a lamp serial code candidate of the object lamp is input in the box 111 in FIG. 8, and a software button 112 described as "CHECK" on the right of the box 111 is pressed, the input is confirmed, and contents input in the box 111 are notified to the CPU 51. Then, in the projector lamp replacement time process of FIG. 5, a result of the determination in the process of step S3 becomes YES, and the process proceeds to step S4.

In step S4, the CPU 51 performs a Check sum confirmation process.

In the above expression, the text information input into the box 111 at the time of the process of step S3 is expressed as a lamp serial code candidate rather than being expressed directly as a lamp serial code. This expression is made because it may be difficult yet to determine whether the text information input in the box 111 is the valid lamp serial code of the object lamp substituted as the lamp 58 at the time of the process of step S3, that is, at the time of the input, including an error in input operation by the lamp replacing worker.

Accordingly, the CPU 51 may need to perform a process of checking whether the text information is a valid lamp serial code using a part corresponding to "Check sum"/"check sum" of the text information input in the box 111 as described above. Such a process is the "Check sum confirmation process" in step S4.

In step S5, the CPU 51 determines whether a result of the "Check sum confirmation process" indicates a valid code.

When the text information (lamp serial code candidate) input into the box 111 is an invalid code, a result of the determination in step S5 is NO, and the process proceeds to step S6. In step S6, the CPU 51 makes an error display on the display unit 72. The error display in this case for example refers to display of a notification indicating that the text information (lamp serial code candidate) input into the box 111 is an invalid code, a notification accordingly prompting for re-input, and the like. Such error display can be realized by making a display in an area 114 in FIG. 8, for example. Thereby the projector lamp replacement time process is ended.

When the text information (lamp serial code candidate) input into the box 111 is a valid code, on the other hand, a result of the determination in step S5 is YES, and the process proceeds to step S7.

That is, at this point in time, it is determined that the text information (lamp serial code candidate) input into the box 111 is a valid code, and therefore the text information input into the box 111 is treated as the lamp serial code in the following processes.

In step S7, the CPU 51 compares a range (hereinafter referred to as a code range) from a minimum wattage (min watt) to a maximum wattage (max watt) included in the lamp serial code with a range (that is, a mode range) from a minimum output wattage to a maximum output wattage in a set lamp mode.

In step S8, the CPU 51 determines whether there is a range where the code range and the mode range overlap each other on the basis of a result of the comparison in step S7.

When there is no range in which the code range and the mode range overlap each other, a result of the determination in step S8 is NO, and the process proceeds to step S9. In step S9, the CPU 51 makes an error display on the display unit 72. The error display in this case for example refers to display of a notification indicating that it is necessary to re-substitute another appropriate lamp as lamp 58 because the object lamp substituted as lamp 58 cannot be controlled by the lamp power supply unit 56 in a present condition, or it is necessary to change the setting of the lamp mode in the lamp power supply unit 56 when the object lamp is used as it is, a notification accordingly prompting for the substitution or the change, and the like. Such error display can also be realized by making a display in the area 114 in FIG. 8, for example. Thereby the projector lamp replacement time process is ended.

When there is a range in which the code range and the mode range overlap each other, on the other hand, a result of the determination in step S8 is YES, and the process proceeds to step S10.

In step S10, the CPU 51 determines the range in which the code range and the mode range overlap each other as a lamp driving controlling range.

Specifically, for example, when the lamp mode set at this point in time is the lamp mode A in FIG. 4, the mode range is a range of 2.0 kW to 4.2 kW. In addition, for example, when the minimum wattage (min watt) included in the lamp serial code is 1.8 kW and the maximum wattage (max watt) included in the lamp serial code is 3.6 kW, the code range is a range of 1.8 kW to 3.6 kW. In such a case, as shown in FIG. 9, the range in which the code range and the mode range overlap each other, that is, a range of 2.0 kW to 3.6 kW is determined as the lamp driving controlling range.

The lamp driving controlling range in this case refers to a range of output power given as an instruction command among commands output by the CPU 51 in FIG. 2 to the lamp power supply unit 56 via the I/O unit 54. That is, the lamp power supply unit 56 performs driving so as to supply the output power specified by the instruction command from the CPU 51 to the lamp 58. Hence, a predetermined power within the lamp driving controlling range (2.0 kW to 3.6 kW in the example of FIG. 9) is specified by the instruction command for the output power which command is issued from the CPU 51. As a result, the lamp power supply unit 56 performs driving within the lamp driving controlling range (2.0 kW to 3.6 kW in the example of FIG. 9). The lamp 58 (the object lamp corresponding to the lamp serial code) is thereby supplied with power within the appropriate range.

After the lamp driving controlling range is thus determined in the process of step S10 in FIG. 5, the process proceeds to step S11.

In step S11, the CPU 51 automatically resets the lamp timer T (T=0). Automatically resetting the lamp timer T in this case refers to performing the process on the basis of a decision by the CPU 51 itself without depending on an external instruction from the input unit 71 or the like at the time of the process of step S11. "Automatically" in the following basically has the same meaning.

Then, in step S12, the CPU 51 makes a log setting (recording of the nominal life time T(life) and the like), and starts a lamp timer management process.

Thereby the projector lamp replacement time process is ended.

Description will be made below of the log setting (recording of the nominal life time T(life) and the like).

The log setting refers to including the contents of the lamp serial code input in the process of step S3 in log history information for the object lamp substituted as the lamp 58 this time and storing the log history information in the memory 52. Specifically, the contents of "manufacturer code", "max watt", "min watt", "life hour", and "lamp serial" are included in the log history information. Incidentally, the contents of "life hour" will hereinafter be referred to as the nominal life time T(life).

Because the log history information is thus stored in the memory 52, the CPU 51 can read the log history information from the memory 52 as necessary, display the log history information on the display unit 72, and provide the log history information to other devices, for example not only the SM device 31 but also the TM device 21 and the maintenance server 12 in FIG. 1 via the communicating unit 59.

Incidentally, in the present embodiment, for example, the log history information can be displayed in an area 113 or the like of the lamp serial code input screen 102 in FIG. 8 described above.

The information included in the log history information is not specifically limited as long as the information included in the log history information is information related to the object lamp substituted this time as lamp 58. In the present embodiment, for example, a measured value of the lamp timer T is adopted as other information indicating the lamp use time of the object lamp.

A process of sequentially updating the measured value of the lamp timer T is the "lamp timer management process" in step S12 in FIG. 5. An example of the lamp timer management process will be described below with reference to FIG. 10.

In step S31, the CPU 51 determines whether an instruction to end the process is given.

Though the determining process in step S31 itself is not specifically limited, suppose that in the present embodiment, for example, it is determined that an instruction to end the process is given when the process of step S11 in FIG. 5 is performed, that is, when the lamp timer T is automatically reset.

That is, in the present embodiment, when the lamp timer T is automatically reset, it is determined in step S31 that an instruction to end the process is given, and the lamp timer management process for the lamp 58 before replacement is ended. Then, step S12 in FIG. 5 is carried out, whereby the lamp timer management process for the lamp 58 after the replacement is newly started.

Hence, in the present embodiment, unless the lamp timer T is automatically reset, a result of the determination in step S31 is NO, and the process proceeds to step S32.

In step S32, the CPU 51 determines whether the lamp 58 has been turned on.

When the lamp 58 has not been turned on, a result of the determination in step S32 is NO, and the process returns to step S31 to repeat the process from step S31 on down. That is, for a period during which the lamp timer T is not automatically reset and the lamp 58 is off, a loop process of steps S31 and S32 is repeated. The lamp timer T therefore continues maintaining a present value for this period.

Thereafter, when the lamp 58 has been turned on, a result of the determination in step S32 is YES, and the process proceeds to step S33. In step S33, the CPU 51 determines whether the lamp 58 has been turned off.

When the lamp 58 continues being on, a result of the determination in step S33 is NO, and the process proceeds to step S34.

In step S34, the CPU 51 increments the lamp timer T (T=T+1).

At this time, in the present embodiment, for example, the measured value of the lamp timer T in the log history information stored in the memory 52 is rewritten. Thus an accurate use time of the object lamp currently used as the lamp 58 is managed.

In step S35, the CPU 51 determines whether the measured value of the lamp timer T is less than the nominal life time T(life) (T<T(life)).

When the measured value of the lamp timer T is less than the nominal life time T(life), a result of the determination in step S35 is YES, and the process returns to step S33 to repeat the process from step S33 on down.

That is, while the lamp 58 is on, unless the lamp timer T reaches the nominal life time T(life), a loop process of steps S33 to S35 is repeated, and the measured value of the lamp timer T is incremented by one for one loop process.

When the lamp 58 is thereafter turned off, a result of the determination in next step S33 is YES, and the process returns to step S31 to repeat the process from step S31 on down.

That is, until the lamp 58 is turned on next, or until the lamp timer T is automatically reset, the loop process of steps S31 and S32 is repeated. The lamp timer T therefore continues maintaining the present value for this period.

When the lamp timer T reaches the nominal life time T(life) while the lamp 58 is on, that is, while the loop process of steps S33 to S35 is repeated, a result of the determination in step S35 is NO, and the process proceeds to step S36.

In step S36, the CPU 51 displays a lamp replacement alarm on the display unit 72. The lamp replacement alarm refers to a message or the like prompting for replacement of the object lamp currently used as lamp 58 with another lamp because the use time of the object lamp has reached the nominal life time (or the use time of the object lamp will soon reach the nominal life time, as will be described later).

Thus, the form of presenting such a message is not specifically limited to image display, and may be any other presenting form such as voice output or the like. That is, the form of presenting the message is not specifically limited as long as the form allows the message indicating that a lamp replacement time has arrived to be presented to a lamp replacing worker (operator or the like).

Figure 10:
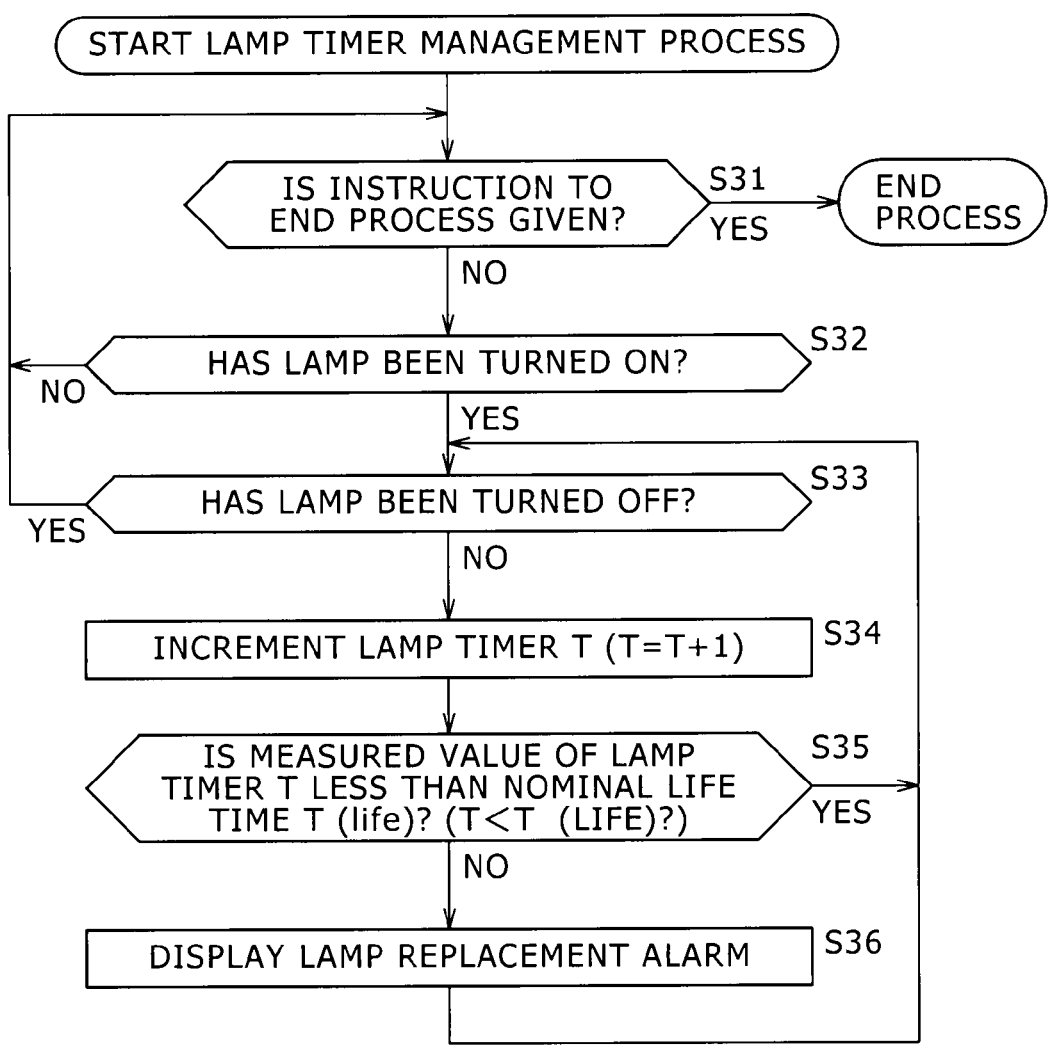
FIG. 10 is a flowchart of assistance in explaining an example of a lamp timer management process among the processes performed by the projector of FIG. 2.

In the example of FIG. 10, when the lamp timer T has reached the nominal life time T(life), the lamp replacement alarm is displayed. However, timing of displaying (presenting) the lamp replacement alarm is not necessarily limited to a point in time when the lamp timer T reaches the nominal life time T(life), and an arbitrary time can be adopted by a designer or the like as long as the arbitrary time is timing based on the nominal life time T(life) (for example a certain time before the nominal life time T(life)). That is, by only determining whether the lamp timer T has reached the adopted time in the process of step S35, the CPU 51 can perform the above-described lamp timer management process in exactly the same manner.

Incidentally, also after the process of step S36, the process returns to step S33 to repeat the process from step S33 on down.

As described above, the projector 33 can perform the projector lamp replacement time process of FIG. 5 and the lamp timer management process of FIG. 10. The projector 33 can therefore solve the various problems described above. This will be described below in more detail.

As described above, an appropriate lamp driving controlling range is automatically determined by performing steps S7 to S10 in FIG. 5 on the projector 33 side, and as a result, the object lamp substituted as lamp 58 this time is driven appropriately. Thereby, even when the object lamp that does not perfectly match the set range (the mode range in the present embodiment) of the lamp power supply unit 56 provided in advance is substituted as lamp 58, the object lamp can be used safely. This is because a range where the code range specified by the lamp serial code attached to the object lamp and the mode range overlap each other is set as the lamp driving controlling range. Further, in the present embodiment, the lamp driving controlling range is determined after the Check sum confirmation process is performed in the process of step S4 and then validity is confirmed, so that a danger of a lamp burst or a failure due to an input error by the operator can be avoided. That is, the lamp size problem can be solved.

Incidentally, a method for determining the lamp driving controlling range is not limited to the above-described example. When attention is directed to only the securing of safety, a method of determining a range not exceeding the maximum wattage (max watt) included in the lamp serial code as the lamp driving controlling range suffices. In consideration of various points such as solving the lamp gain problem to be described later and the like, it is desirable to adopt the example of the above-described method, that is, the determining method of determining the range in which the mode range and the code range overlap each other as the lamp driving controlling range.

In addition, as described above, the projector 33 can automatically reset the lamp timer T in the process of step S11 in FIG. 5, then make a log setting in the process of step S12, and start the lamp timer management process (see FIG. 10). Thereby, the log history information for the object lamp substituted this time as lamp 58 is properly stored, and the lamp use time (lamp timer T) is properly updated. Such log history information can be displayed as appropriate, and can also be output to the outside. Further, when the lamp timer reset button is pressed in the process of step S1, the lamp timer T is not immediately reset. The lamp timer T is automatically reset in the process of step S11 only after validity is confirmed by the Check sum confirmation process in step S4. Thereby, even when the lamp life of the object lamp has ended within a guaranteed time of the lamp, the log history data can be used as means for officially proving that the lamp life of the object lamp has ended within the guaranteed time of the lamp. That is, the log history data can be used as one of materials for proving that the object lamp is defective. In addition, the log history information can be used as a material for determining the replacement time of a part whose periodic replacement time differs depending on light quantity (lamp size). That is, the lamp use history problem can be solved.

Though the above description is repeated, as described above, the lamp timer T is not immediately reset when the lamp timer reset button is pressed in the process of step S1 in FIG. 5. The lamp timer T is automatically reset in the process of step S11 only after explicit pop-up display of the lamp serial code input screen is made in the process of step S2 and then a valid lamp serial code is input to the lamp serial code input screen, that is, only after validity is confirmed by the Check sum confirmation process in step S4. Therefore correct management of the lamp timer T can be expected. When the object lamp substituted this time as lamp 58 is not certified for the projector 33, a lamp serial code should not be attached to the object lamp for a management reason. Therefore a correct lamp serial code is not input, so that a result of the Check sum confirmation process in step S4 indicates an invalid code, a result of the determination in the process of step S5 is NO, and an error display is made in the process of step S6. It is thereby possible to avoid a danger posed by using a non-certified object lamp as lamp 58, that is, a danger of a failure of the projector 33, a burst of the lamp 58, or the like. Thus, the lamp management problem can be solved.

In addition, as is clear from the process of steps S7 to S10 in FIG. 5 described above, a mode range set on the projector 33 side in advance is not used as the lamp driving controlling range as it is, but the lamp driving controlling range is properly determined also in consideration of the code range determined from the externally given lamp serial code. That is, in loading one of object lamps of various lamp sizes from a plurality of lamp manufacturers (lamp makers) that cannot be supposed at the time of design as lamp 58 into the projector 33, the code range is externally input on the basis of the lamp serial code attached to the object lamp. Therefore the lamp driving controlling range can be optimized easily. As a result, a maximum lamp gain can be secured safely. That is, the lamp gain problem can be solved.

The nominal life time of the lamp is varied according to a lamp manufacturer (lamp maker) and lamp size (input rating), and even the same lamp may be improved in terms of life. In such a case, in the present embodiment, as described above, the nominal life time of the object lamp substituted as lamp 58 is included as "life hour" in the lamp serial code, and the "life hour" is used as the nominal life time T(life) to be compared with the lamp timer T in the lamp timer management process of FIG. 10 described above. Then, when the lamp timer T has reached the nominal life time T(life), a lamp replacement alarm is displayed in the process of step S36 in FIG. 10. This means that even when any one of object lamps having various nominal life times is substituted as lamp 58, a lamp replacement alarm corresponding to the nominal life time of the object lamp can be automatically presented, that is, that the lamp replacement time problem can be solved.

Figure 11:
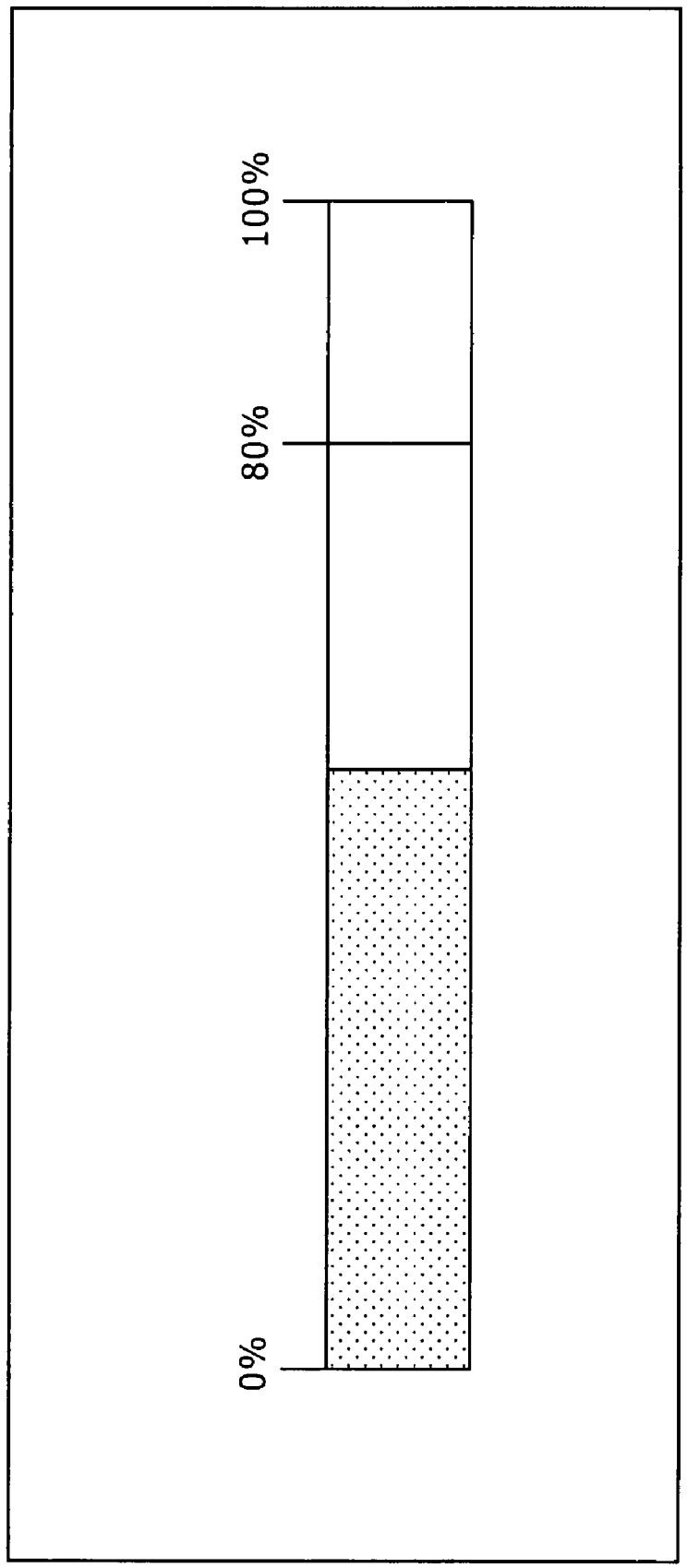
FIG. 11 is a diagram showing an example of a GUI image showing the use time of the lamp loaded in the projector of FIG. 2.

Further, the measured value of the lamp timer T sequentially updated in the lamp timer management process of FIG. 10 and the nominal life time T(life) are stored in the memory 52 in FIG. 2 so as to be readable at any time as a part of the log history information for the object lamp being used as lamp 58. Therefore, as shown in FIG. 11, for example, a ratio of the use time (the measured value of the lamp timer T) in the present conditions of the object lamp to the nominal life time T(life) can be readily displayed on the display unit 72 or the like. It is to be noted in this case that the ratio (%) is displayed rather than a fixed time (hr or the like), so that even when any one of object lamps having various nominal life times is substituted as lamp 58, the ratio can be displayed on the display unit 72 or the like without the display form of FIG. 11 being changed.

Further, as is clear from the configuration of FIG. 1, the projector 33 can be connected to external devices directly or indirectly, and send and receive various information to and from the external devices by communicating with the external devices directly or indirectly.

Thus, for inputting information, the input unit 71 of the projector 33 in FIG. 2 does not necessarily need to be used, and an input function of an external device, for example an input function of the SM device 31, a personal computer not shown in the figure, or the like can be used. Similarly, for presenting information, the display unit 72 of the projector 33 in FIG. 2 does not necessarily need to be used, and various presenting functions such as a display function, a voice output function and the like of external devices can be used. Specifically, for example, a display function or the like of the SM device 31 or the personal computer not shown in the figure may be used.

Thereby, for example, a lamp replacing worker or the like can input the lamp serial code of the object lamp substituted as lamp 58 using the SM device 31 or the personal computer not shown in the figure, and be presented with various information based on log history information for the object lamp.

In addition, log history information for an object lamp being used as lamp 58 in a predetermined projector 33 can be easily transmitted to not only the SM device 31 and the TM device 21 but also the maintenance server 12. It is therefore possible to collectively manage log history information for respective object lamps being used as respective lamps 58 in a plurality of projectors 33 in a unit of a screening place 22, in a unit of a movie theater 11, or in a unit of a service for the maintenance of a plurality of movie theaters 11.

The lamp serial code in the above-described example is used in a state of being printed on a label or a paper medium. However, the lamp serial code is not specifically limited to the above-described example, and effect equal to or greater than that of the above-described example can be produced by using other media such for example as a bar code, an IC (Integrated Circuit) chip, or the like. The effect equal to or greater than that of the above-described example can be produced because the bar code, the IC chip, or the like can be generally applied to more various purposes as compared with the label or the paper medium, so that the application of the bar code, the IC chip, or the like to the lamp serial code is highly likely to give rise to various uses, and in this case, effect greater than that of the above-described example can be expected.

Figure 12:
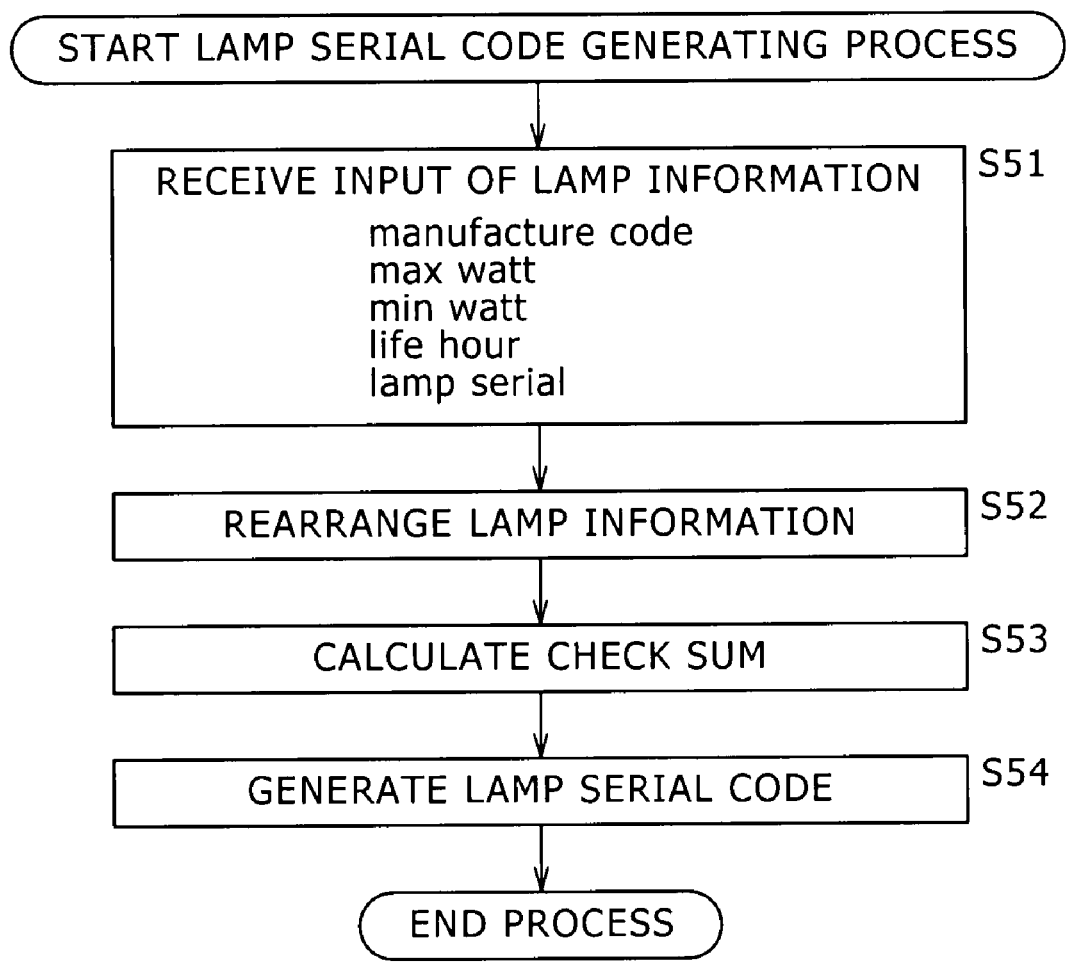
FIG. 12 is a flowchart of assistance in explaining a process of generating a lamp serial code for a lamp to be loaded in the projector of FIG. 2, that is, an example of a lamp serial code generating process.

The lamp serial code having such various potentials can be readily created by for example making a device (not shown)

for use by a lamp manufacturer (manufacturing maker) perform a lamp serial code generating process of FIG. 12.

FIG. 12 represents an example of the lamp serial code generating process.

In step S51, the device receives the input of lamp information by the lamp manufacturer (manufacturing maker) or the like.

The lamp information in this case refers to information excluding "Check sum"/"check sum" of information to be included in a lamp serial code. When a lamp serial code having the structure of FIG. 7 described above is adopted, for example, the lamp information refers to "manufacturer code", "max watt", "min watt", "life hour", and "lamp serial", as listed in the box of step S51 in FIG. 12. Each piece of lamp information in this case does not necessarily need to be input by a same method, or does not necessarily need to be input in same timing. In addition, the order of the input is not specifically limited.

In any case, when all the lamp information has been input, the process proceeds from step S51 to step S52.

In step S52, the device rearranges the lamp information. This rearrangement conforms to the structure of the lamp serial code. Thus, when the lamp serial code having the structure of FIG. 7 described above is adopted, the lamp information is rearranged in order of "manufacturer code", "max watt", "min watt", "life hour", and "lamp serial".

In step S53, the device calculates a check sum for the thus rearranged lamp information. That is, "Check sum"/"check sum" is calculated.

In step S54, the device generates a lamp serial code. That is, the lamp serial code is generated by adding the check sum calculated in the process of step S53 to the lamp information rearranged in the process of step S52. For example, when the lamp serial code having the structure of FIG. 7 is adopted, information formed by arranging the pieces of text information "Check sum/manufacturer code/max watt/min watt/life hour/lamp serial/check sum" is generated as the lamp serial code.

The series of processes described above can be carried out not only by hardware but also by software. When the series of processes is to be carried out by software, a program constituting the software is installed from a program recording medium onto a computer incorporated in special hardware, for example a computer including the CPU 51 incorporated in the projector 33 of FIG. 2 described above, or a computer that can perform various functions by installing various programs thereon, for example a general-purpose personal computer.

As shown in FIG. 2, for example, the program recording medium storing the program to be installed onto a computer and set in a state of being executable by the computer is formed by the removable medium 74 as packaged medium including a magnetic disk (including flexible disks), an optical disk (including CD-ROM (Compact Disk-Read Only Memory) and DVD (Digital Versatile Disk)), a magneto-optical disk, a semiconductor memory or the like, or formed by the memory 52 where the program is stored temporarily or permanently, a hard disk not shown in FIG. 2, or the like. As necessary, the storing of the program onto the program recording medium is performed via the communicating unit 59 as an interface such as a router, a modem or the like using a wire or wireless communication medium such as a local area network, the Internet, digital satellite broadcasting or the like.

It is to be noted that in the present specification, the steps describing the program stored on the program recording medium include not only processes carried out in time series in the described order but also processes carried out in parallel or individually and not necessarily in time series.

In the present specification, a system refers to an apparatus or circuitry as a whole formed by a plurality of devices or circuits.

It should be understood by those skilled in the art that various modifications, combinations, sub-combinations and alterations may occur depending on design requirements and other factors insofar as they are within the scope of the appended claims or the equivalents thereof.

What is claimed is:

1. A projector that can be loaded with lamps of a plurality of kinds, each of a plurality of said lamps loadable into said projector being given a lamp serial code formed by arranging lamp information including at least a minimum wattage and a maximum wattage of the lamp and a check sum in predetermined order, said projector comprising:

a lamp power supply for driving a lamp loaded in said projector, said lamp power supply being provided in advance with a plurality of mode ranges each as a range from a minimum wattage to a maximum wattage of output of said lamp power supply, and one predetermined mode range of said plurality of mode ranges being freely set in said lamp power supply; and a control circuit for controlling said lamp power supply and checking an accuracy of said lamp serial code using said check sum;

wherein said control circuit identifies a range from the minimum wattage to the maximum wattage included in said lamp serial code given to said lamp loaded in said projector as a code range, and compares the code range with said predetermined mode range set in said lamp power supply, said control circuit determines another range that is not below said minimum wattage nor exceeding said maximum wattage included in said lamp serial code as a lamp driving controlling range within which the driving of said lamp power supply is controlled on a basis of a result of comparison of said code range with said mode range, and said control circuit controls the driving of said lamp power supply within the determined lamp driving controlling range.

2. The projector according to claim 1, wherein said control circuit determines a range in which said code different mode range or said plurality of mode ranges and said mode range overlap each other as said lamp driving controlling range.

3. A control method of a projector that can be loaded with lamps of a plurality of kinds, each of a plurality of said lamps loadable into said projector being given a lamp serial code formed by arranging lamp information including at least a minimum wattage and a maximum wattage of the lamp and a check sum in predetermined order, said projector including a lamp power supply for driving said lamp loaded in said projector, said lamp power supply being provided in advance with a plurality of mode ranges each as a range from a minimum wattage to a maximum wattage of output of said lamp power supply, and one predetermined mode range of said plurality of mode ranges being freely set in said lamp power supply, and a control circuit for controlling said lamp power supply, said control method comprising:

said control circuit checking an accuracy of said lamp serial code using said check sum;

said control circuit identifying a range from the minimum wattage to the maximum wattage included in said lamp serial code given to said lamp loaded in said projector as a code range, and comparing the code range with said predetermined mode range set in said lamp power supply;

said control circuit determining another range that is not below said minimum wattage nor exceeding said maximum wattage included in said lamp serial code as a lamp driving controlling range within which the driving of said lamp power supply is controlled on a basis of a result of comparison of said code range with said mode range; and said control circuit controlling the driving of said lamp power supply within the determined lamp driving controlling range.

* * * * *